US006076039A

United States Patent [19]
Kabel et al.

[11] Patent Number: 6,076,039
[45] Date of Patent: Jun. 13, 2000

[54] NAVIGATION DEVICE AND METHOD FOR DISPLAYING CARTOGRAPHIC MARKERS

[75] Inventors: Darrin W. Kabel; Jay Dee Krull, both of Olathe; Thomas H. Walters, Gardner, all of Kans.

[73] Assignee: Garmin Corporation, Taipei, Taiwan

[21] Appl. No.: 09/146,247

[22] Filed: Sep. 3, 1998

[51] Int. Cl.⁷ .......................... G06F 165/00; G01C 21/00
[52] U.S. Cl. ........................ 701/206; 701/211; 340/988
[58] Field of Search ................................. 701/206, 200, 701/201, 213, 211; 340/988; 342/357.06, 357.08, 357.13

[56] References Cited

U.S. PATENT DOCUMENTS

| | | | |
|---|---|---|---|
| 4,086,632 | 4/1978 | Lions | 701/210 |
| 4,486,857 | 12/1984 | Heckel | 364/900 |
| 4,677,450 | 6/1987 | Ito et al. | 701/212 |
| 4,754,465 | 6/1988 | Trimble | 375/1 |
| 5,204,817 | 4/1993 | Yoshida | 364/449 |
| 5,225,842 | 7/1993 | Brown et al. | 342/357 |
| 5,297,051 | 3/1994 | Arakawa et al. | 364/449 |
| 5,715,163 | 2/1998 | Bang et al. | 701/202 |
| 5,765,169 | 6/1998 | Conner | 707/200 |
| 5,802,492 | 9/1998 | DeLorme et al. | 455/456 |
| 5,839,088 | 11/1998 | Hancock et al. | 701/213 |

OTHER PUBLICATIONS

Cartographica, vol. 24, #2, Summer, 1987 "*Automated Line Generalization*".

*Primary Examiner*—Michael J. Zanelli
*Attorney, Agent, or Firm*—Shook, Hardy & Bacon L.L.P.

[57] ABSTRACT

A method and navigation device for abbreviating names of cartographic markers. A navigation device has a processor, a display, an input, and a memory having cartographic data stored therein. The cartographic data includes names of geographical locations. Using the input, an operator of the navigation device enters a waypoint by selecting a desired geographical location. The processor retrieves from memory the geographic name associated with the selected location, and when the geographic name exceeds a desired number of characters, processes the name to abbreviate it to fit within the desired number of spaces. The abbreviation process involves eliminating spaces, vowels, one consonant of a pair of double consonants, one vowel of a pair of double vowels, and/or one or more special characters (e.g., colons, commas, apostrophes, slashes, symbols, or other punctuation marks) as necessary, to reduce the geographic name to the desired number of characters.

18 Claims, 2 Drawing Sheets

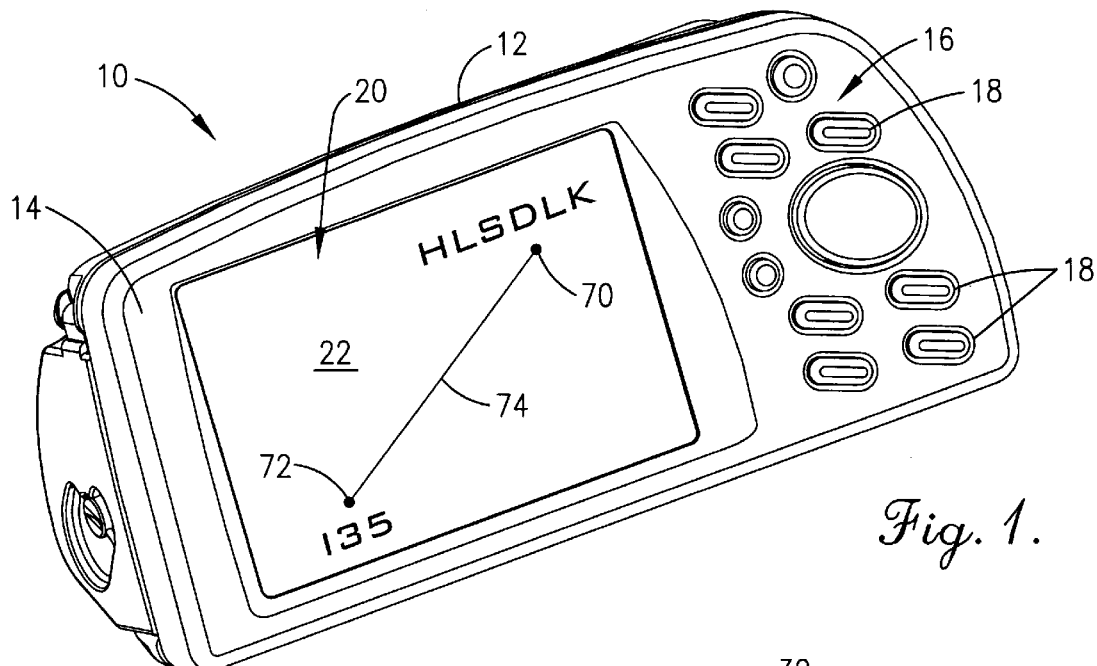
Fig. 1.
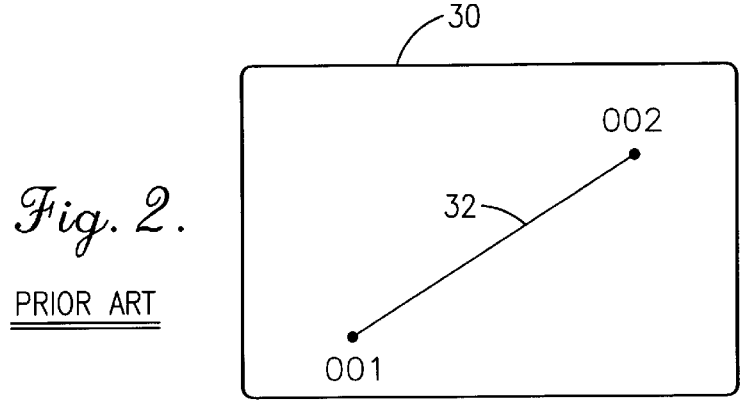
Fig. 2.
PRIOR ART
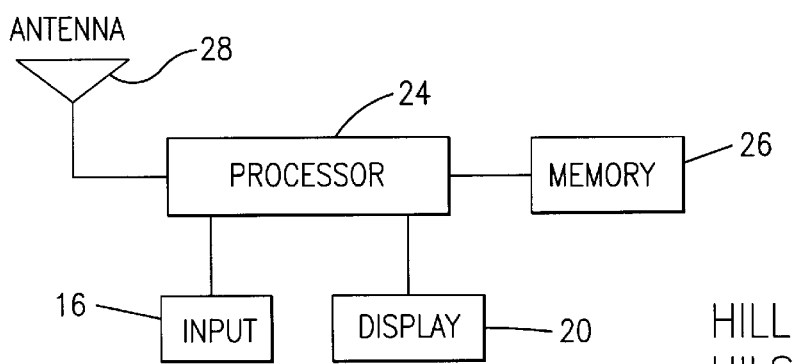
Fig. 3.
HILLSDALE LAKE
HILSDALE LAKE
HILSDALELAKE
HLSDLLK
HLSDLK
Fig. 4.

NAVIGATION DEVICE AND METHOD FOR DISPLAYING CARTOGRAPHIC MARKERS

BACKGROUND OF THE INVENTION

1. Field of the Invention

The present invention is generally directed to an electronic navigational device employing a receiver for receiving GPS satellite signals. More particularly, the present invention is directed to an electronic navigation device and method for displaying cartographic markers in an abbreviated manner.

2. Description of the Related Art

Electronic navigation devices employing GPS receivers have become increasingly popular in recent years. The devices utilize an electronic navigation system which permits a user of the system to determine his or her position with respect to the earth. Such navigation devices are extremely useful in navigational vehicles of all types, including aircraft, marine craft, and land vehicles. Additionally, the devices are useful for tracking purposes, and hand held versions are popular with hikers and campers.

Very generally, conventional electronic navigation devices employ a receiver which detects signals from a number of satellites orbiting the earth. A processor within the navigation device computes the location of the device, based upon data received from the received satellite signals, after a sufficient number of GPS satellite signals have been acquired. Particularly, once a significant number of GPS satellite signals are acquired, the device is able to calculate its position with respect to the various satellites. Thus, an electronic navigation device employing a GPS receiver has the ability to accurately compute the position of the device in real time, even as the device moves. Additionally, the device is able to calculate the velocity and direction in which the device is moving in three dimensions.

U.S. Pat. No. 5,323,164 to Endo teaches a Satellite Radio Wave Capturing Method for Global Positioning System Receiver. U.S. Pat. No. 5,225,842 to Brown, et al. teaches a Vehicle Tracking System Employing Global Positioning Satellites. Each of these patents is incorporated herein by reference.

Both recreational and professional users of navigation equipment seek intuitive representations of navigation information which are direct and simple to interpret. The ability of a navigation device to present navigation information in a manner that is simple to interpret is particularly important for professional users, who use the equipment as one basis for navigating a vessel, such as an aircraft or marine craft.

Conventional navigational devices permit a user to input a number of waypoints, and thereby define one or more navigational routes. Additionally, the user can input waypoints to identify points of interest or hazards. In particular, conventional navigational devices have a large volume of cartographic data stored in memory. Using a keypad input, a user can input a waypoint corresponding to a geographical location. A waypoint is typically entered by placing a pointer at a desired location on the display screen displaying cartographic map data, and pressing an enter button to enter a waypoint at the selected location. In the past, navigational devices typically allocated a number to each waypoint entered into the device. Thus, for example, an initially entered waypoint would be allocated to No. 1, a subsequently entered waypoint would be allocated to No. 2, and so on.

In conventional GPS navigation devices, upon entering a waypoint, the user has the ability to define the waypoint with a character string. While a number of user interfaces are commonly employed, one popular approach is to permit a user to highlight the number associated with the entered waypoint, and press a button to retrieve a list of alphabetic characters. Then, using arrow or scroll keys, the user can select a desired alphabetic character for each of a defined number of locations, to thereby create a character string, for display on the display screen. The defined character string readily identifies the geographic location associated with the selected waypoint. For example, a navigator may select as a waypoint Olathe, Kans. As stated, this is accomplished by moving a pointer to the location of Olathe, Kans. on a map displayed on the display screen of the navigation device and pressing an Enter button. In the manner described, the user can then enter a character string to identify the selected waypoint as Olathe, Kans. However, it will often be necessary for the operator to abbreviate the name of the geographic location to allow it to fit within the defined number of spaces permitted for the character string.

As will be appreciated, while the ability to enter a character string which identifies a particular waypoint is desirable, the method in which this is carried out in conventional devices is extremely cumbersome and time consuming. In addition to the operator having to mentally determine an appropriate abbreviation in many instances, the operator must then physically enter that abbreviated character string into the memory of the device using the keypad. Thus, for example, for a character string that is to be six characters, the operator would have to individually select and enter each of the six characters, which requires a great deal of scrolling through characters and selecting the appropriate character for each space in the string. Thus, conventional devices require the operator to execute a great number of keystrokes or input functions just to enter and store a character string indicative Of a single waypoint. If multiple waypoints are desired, as is usually the case, this process becomes extremely time consuming and frustrating for the operator.

Accordingly, the need exists for a navigational device which permits an operator to easily identify a waypoint with a meaningful character string. More particularly, the need exists for a navigational device which relieves the operator from having to mentally configure an appropriate abbreviation for a geographic location, when necessary, and further relieves the operator from having to execute a substantial number of keystrokes or input functions in order to enter a character string indicative of a selected waypoint. The present invention overcomes the drawbacks of the prior art, and meets the foregoing and other needs.

SUMMARY OF THE INVENTION

The present invention is a unique electronic navigation device, and method, for abbreviating names of cartographic markers. The device includes a housing for housing a processor and a keypad input unit, a memory, a display having a display screen, and an antenna, all of which are connected to the processor. The navigational device is operable to acquire satellite signals from global positioning satellites and compute a geographic and altitude location of the device in a conventional manner. The navigational device and method of the present invention may be incorporated in a portable handheld unit, or may be incorporated in a unit to be mounted in a vehicle or vessel, such as an automobile, truck, airplane or boat. Cartographic data, including names of various geographical locations, is stored in memory.

In operation, an operator using the navigation device enters one or more waypoints with the keypad input in a conventional fashion. The operation of entering a waypoint into a navigation device will be readily understood by those with skill in the manufacture or use of navigational devices. Summarizing this operation, as the display screen of the navigation device displays an electronic map formed from the cartographic data stored in memory, the operator uses the keypad input to move a pointer to a location at which a waypoint is desired. Then, by pressing an Enter button on the keypad input, the processor determines that the operator is entering a waypoint at the selected location, and the processor stores the waypoint in memory. Unlike prior art devices, however, in which complicated and cumbersome steps for defining the selected waypoint with a character string is required, in accordance with the principles of the present invention, the processor determines whether the geographical location corresponding to the selected waypoint has a corresponding name stored in memory. In the event a name exists in memory, the processor carries out a sequence of processing steps to display that name in the form of a character string on the display in association with the selected waypoint. In accordance with the preferred embodiment of the present invention, the maximum number of spaces in a character string is six. Accordingly, since the names of many geographical locations will exceed that number, the processor processes a sequence of processing steps to reduce the number of characters in the name of the geographical location to the maximum number of permissible characters, namely six. More particularly, the processing steps carried out by the processor manipulate the name of a geographical location that exceeds six characters to an easily recognizable abbreviation of that name.

In accordance with the invention, when the processor determines that there is a character string stored in memory in association with a selected waypoint, the processor retrieves the character string and determines whether it fits within a desired number of spaces. As described, the preferred embodiment of the present invention permits a character string to have no more than six spaces. At any point during the processing, when the processor determines that the character string fits within the desired number of spaces, the processor advances to determine whether the character string is the same as another character string defining a different waypoint. In the event there is no such match, the processor stores the character string in memory and displays the character string on the display screen in association with the selected waypoint location. When, however, the processor determines that the character string is the same as another character string, then the processor processes the current character string to add a number to its right end.

When, the processor determines upon retrieval of a character string from memory that it does not fit within the maximum number of spaces permitted by the character string, the processor carries out a sequence of instructions to reduce the number of characters in a string to make it fit within the desired number of spaces. Particularly, in accordance with a preferred method of the present invention, the processor first eliminates any special characters (such as colons, apostrophe's, slashes, or other punctuation marks) within the character string. Upon completion of that step, in the event the character string still does not fit within the maximum number of spaces permitted by the character string, the processor determines whether there are any double consonants in the remaining character string, and proceeds to remove any double consonants, starting at the right most character in the string. At any time the character string is reduced to the maximum number of spaces permissible within a character string designation, processing again advances to the step of determining whether or not another character string has a name. When, however, any and all double consonants have been removed, and the character string still does not fit within the desired number of spaces, the processor then processes the remaining character string to eliminate blanks from the character string, starting at the right hand edge. For example, in the event the name associated with a selected geographical location for a waypoint is "Hillsdale Lake", the processor processes the character string "HILLSDALE LAKE" to remove the space between the two words "HILLSDALE" and "LAKE". When all blanks have been removed, and the character string still does not fit within the desired number of spaces, the processor processes the remaining character string to remove double vowels from the character string, starting at the right hand edge. Again, at any point during the process in which double vowels are removed, that the character string fits within the desired number of spaces, manipulation of the character string stops and processing advances to again determine whether or not this character string is the same as another character string.

When, however, removal of all double vowels from the character string still does not result in a character string which fits within the desired number of spaces, the processor processes the character string to remove vowels, starting at the right hand edge. When, however, removal of all vowels from the character string still does not result in a character string which fits within the desired number of spaces, the processor again determine whether there are any double consonants present in the character string. In this regard, it will be understood that removal of vowels from the character string at an earlier step may have again resulted in double consonants being located adjacent each other. Starting at the right most character, any double consonants are removed until the character string fits within the desired number of spaces. If, however, removal of any and all remaining double consonants does not result in a character string fitting within the desired number of spaces, the processor then sequentially removes characters from the right hand of the string until the character string fits within the desired number of spaces.

Accordingly, the present invention provides a unique navigation device and method for abbreviating geographical names (e.g., cartographic markers), storing these abbreviated names in memory, and/or displaying the names on the display screen in association with selected waypoints. Additionally, the method of the present invention for abbreviating a name of a geographical location is particularly efficient in that it sequentially abbreviates the name to a resulting character string in a manner which results in a character string that still readily identifies the selected location, thus relieving the operator of the navigation unit from having to mentally abbreviate a name and then execute a substantial number of input functions to store the abbreviated name in memory.

BRIEF DESCRIPTION OF THE DRAWINGS

The objects and features of the invention noted above are explained in more detail with reference to the drawings, in which like reference numerals denote like elements, and in which:

FIG. 1 is a perspective view of a navigational device of the present invention;

FIG. 2 is a graphical representation of a display screen of a prior art navigational device;

FIG. 3 is a block diagram of the hardware of the navigational device of the present invention;

FIG. 4 is a graphical illustration of the abbreviation methodology of the present invention as it is applied to a particular geographical name.

DETAILED DESCRIPTION OF THE INVENTION

Figure 5:
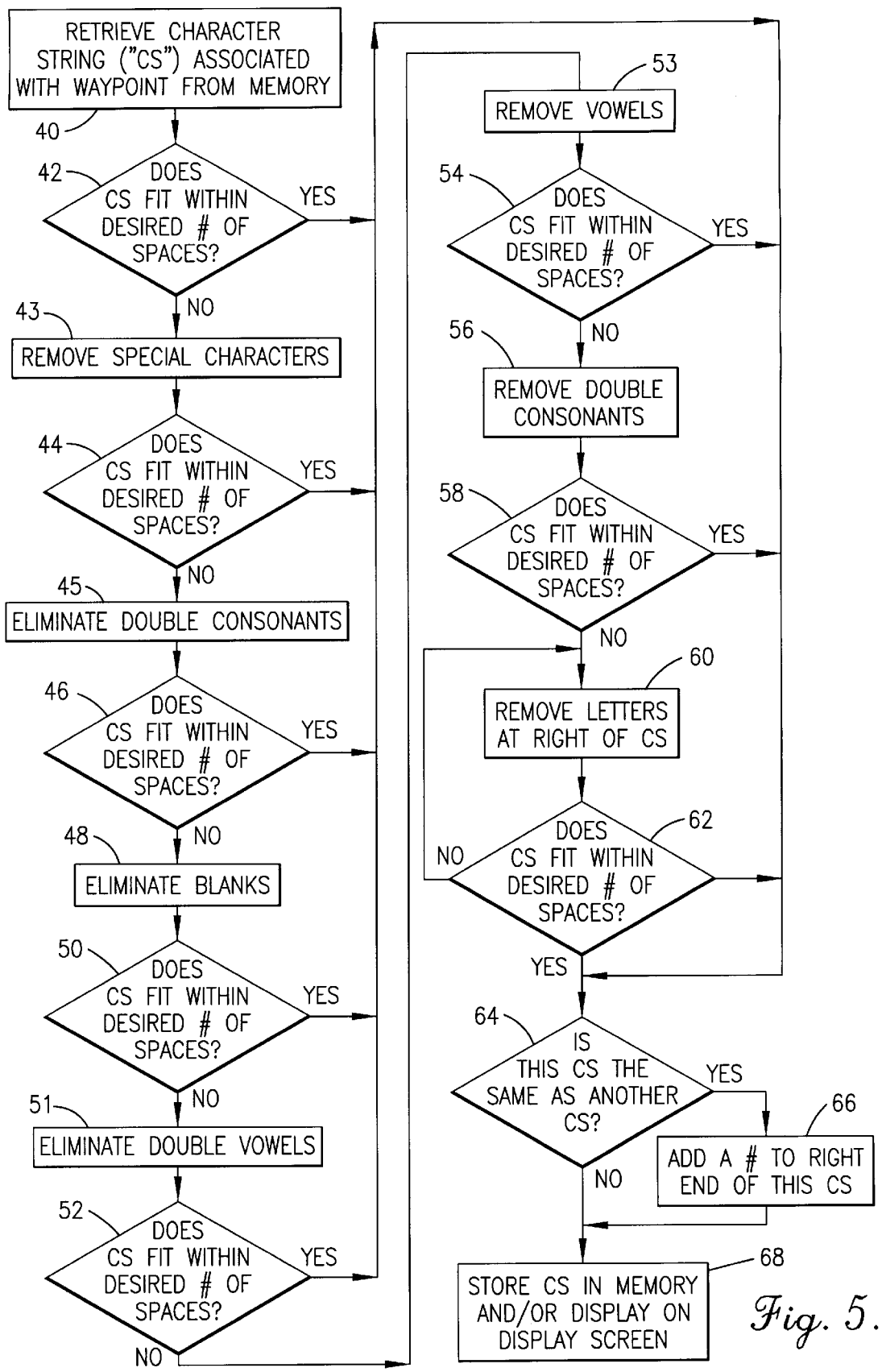
FIG. 5 is a flow chart diagram of the abbreviation method of the present invention.

With reference initially to FIG. 1, a navigation device of the present invention is designated generally by the reference numeral 10. As illustrated, navigation device 10 has a housing 12, adapted to rest on a surface. Navigation device 10 has a front face 14, including an input area comprised of a keypad 16 with keys 18, and a display designated generally by reference numeral 20, having a display screen 22. It should be understood that the structure of navigational device 10 is shown as illustrative of one type of navigational device. Other physical structures, such as a portable handheld unit, are contemplated and within the scope of this invention.

As illustrated in the block diagram of FIG. 3, navigation device 10 of the present invention includes a processor, designated by reference numeral 24. Keypad 16 and display 20, as well as memory 26 and an antenna 28, are connected to processor 24, as shown. In accordance with the principles of the present invention, and as described in detail below, display 20 displays navigational information, such as navigational route and/or landmark or hazard information, with certain selected waypoints being designated by an abbreviated character string, as generated by the device 10.

With reference to FIG. 2, a prior art method for displaying navigation data is shown and described.

In the prior art example shown in FIG. 2, a user of a prior art navigation device has entered two waypoints, namely, waypoint 001 and waypoint 002. A line 32, indicative of a navigational route from waypoint 001 to weight point 002, is shown on the display screen 30. Conventional prior art navigation devices identify waypoints in the manner illustrated in FIG. 2. In particular, in conventional prior art navigation devices, each entered waypoint is designated a number, with each subsequently entered waypoint being designated the next sequential number. While such an approach is useful for distinguishing one waypoint from another, it is seen that this approach does not readily indicate to the operator the actual geographical location of the selected waypoint 001 or 002.

In an effort to overcome this disadvantage, many prior art devices provide for an input interface which permits an operator to define a character string which is indicative of the geographical location of the selected waypoint. However, such prior art devices, due to hardware and space constraints, often require the operator to mentally determine an appropriate abbreviation for a geographical name. Additionally, the operator must individually select each character of the abbreviation and enter it into the device for association with the selected waypoint. Accordingly, this process is extremely time consuming and requires the operator to execute a significant number of input operations.

With additional reference now to FIGS. 4 and 5, operation of the present invention is illustrated and described.

In operation, when an operator enters a waypoint in a conventional manner, processor 24 determines the geographical location of the selected waypoint (e.g., the latitude and longitude), and determines whether there is a name, stored in memory, associated with the selected geographical location. In accordance with the principles of the present invention, in the event there is no geographical location name stored in memory in association with the selected waypoint location, then processor 24 corresponds a numerical indicia with the selected waypoint, and stores that numerical indicia in memory, and/or displays it on the display screen 22. Alternatively, the operator may select a conventional prior art feature for retrieving a list of alphabetic characters, and creating a character string indicative of the selected waypoint location.

With reference to FIG. 5, when processor 24 determines that there is a geographical name stored in memory in association with the selected waypoint location, processor 24 retrieves from memory the name (e.g., the character string) associated with the waypoint, as indicated at step 40 of FIG. 5. As indicated at step 42, processor 24 then determines whether the character string fits within a desired number of spaces for the character sting. In this regard, it will be understood and appreciated that space constraints on display screen 22, as well as memory constraints, require a maximum limitation in the number of characters to be included in a character string. In accordance with the principles of the present invention, the maximum number of characters permitted in a character string is six, although it will be appreciated that another number of characters could be selected. When processor 24 determines at step 42 that the character string does not fit within the maximum number of spaces permitted in the character string, processing advances to step 43, where processor 24 eliminates any special characters (such as colons, apostrophes, slashes, etc.) in the character string. Elimination of special characters occurs by processing the string from the right hand edge of the character string to the left hand edge, such that, once the string of characters fits within the desired number of spaces, no further special characters will be eliminated.

Once any and all special characters have been eliminated from the character string, the processor again determines, as indicated at step 44, whether the now abbreviated character string fits within the maximum number of spaces permitted in the character string. In the event the character string still does not fit within the desired number of spaces, processing advances to step 45, where the processor eliminates double consonants from the character string. Again, in the process of eliminating double consonants, processor 24 works from the right most character of the character string to the left most character. As this process is carried out in the preferred embodiment, at any point at which one of a pair of double consonants is removed and the resulting abbreviated character string fits within the selected number of spaces, no additional double consonant pairs are processed.

Once any and all double consonants are eliminated from the character string, processing advances to step 46 where it is determined whether the character string fits within the maximum number of spaces. If the character string still does not fit within the desired number of spaces, processor advances to step 48, where processor 24 eliminates blanks in the character string. In accordance with the preferred principles of the present invention, the processing step 48 for eliminating blanks in the character string works from the right hand edge of the character string to the left hand edge. In this regard, each time a blank space is eliminated, the processor again determines whether the character string fits within the desired number of spaces. Thus, in the case where there are multiple blanks within a character string, it may not be necessary to eliminate all spaces before the resulting abbreviated character string fits within the desired number of spaces.

Once any and all blanks have been eliminated from the character string at step 48, if the character string still does not fit within the desired number of spaces, as determined at step 50, processing advances to step 51, where processor 24 eliminates any double vowels from the character string. In this regard, elimination of double vowels involves removal of one vowel of a pair of adjacent like vowels. Again, as with other processing steps, the elimination of double vowels involves processing the character string from the right hand edge to the left hand edge, such that when removal of one vowel of a pair of double vowels results in the character string fitting within the desired number of spaces, no additional vowel pairs need be processed. When, however, any and all double vowels have been processed, and the character string still does not fit within the desired number of spaces, processing advances to step 53, where processor 24 removes vowels from the character string. Again, processor 24 works from the right most character in the string to the left most character, and removes vowels one at a time. As will by now be understood, in the event a vowel is removed and the resulting character string fits within the maximum number of spaces, no additional vowels will be removed from the string.

Once any and all vowels have been removed from the character string at step 53, processing advances to step 54, where it is again determined whether the character string fits within the maximum number of spaces permitted in a character string. In the event the character string still does not fit within the desired number of spaces, processing advances to step 56 to again remove any double consonants in the same manner as previously described. In this regard, it will be appreciated that the removal of vowels may have resulted in like consonants being paired adjacent each other. Once again, this processing is carried out from the right hand most character of the string, to the left, and will stop once the string fits within the maximum number of characters.

Upon removal of any double consonants at step 56, processor 24 again determines at step 58 whether the resulting character string fits within the maximum number of spaces. When it is determined that the character string still does not fit within the maximum number of spaces, processing proceeds to step 60, where processor 24 removes a letter at the right of a character string. As illustrated by step 60 and 62, letters will continuously be dropped from the right hand edge of the character string until the character string fits within the maximum number of spaces permitted for a character string.

As illustrated in FIG. 5, at any point during the process at which the character string fits within the maximum number of spaces permitted, processing advances to step 64, where processor 24 determines whether the character string is the same as another character string corresponding to a different waypoint. This processing step is a safeguard to prevent two different waypoints from having the same abbreviated name. When it is determined at step 64 that this character string has the same name as another character string, processing advances to step 66, and the right most character of the character string is replaced with a number. As will be understood, in the event a subsequent character string also matches the character string, then processing step 66 will add the next sequential number to the end of that particular character string. When, however, it is determined at processing step 64 that this character string is not matched by another character string, processing advances to step 68 where the character string is stored in memory and/or displayed on the display screen in association with the selected waypoint.

With reference to FIG. 4, an illustration of the abbreviation process just described is applied to a waypoint named "HILLSDALE LAKE". As illustrated, HILLSDALE LAKE is two words that are longer than the desired number of spaces permitted for a cartographic marker character string. Accordingly, during processing step 45 of FIG. 5, "HIILSDALE LAKE" is abbreviated to "HILSDALE LAKE" (double consonant eliminated). Since HILSDALE LAKE still does not fit within the desired number of spaces, namely six, working from the right hand edge of that character string, blanks are eliminated, resulting in HILSDALELAKE. Since HILSDALELAKE still does not fit within the desired number of spaces, processor 24 removes vowels from the character string, in accordance with processing step 53, thus resulting in HLSDLLK. Since HLSDLLK still does not fit within the desired number of spaces, the double consonants resulting from removal of vowels are processed so that one of the consonants of the pair of double consonants is removed, resulting in an abbreviated character string HLSDLK. Since HLSDLK is within the desired number of spaces, that character string is useful as an abbreviated cartographic marker name for the selected waypoint, so long as it does not match a previous abbreviated name.

As illustrated in FIG. 1, display screen 22 of navigation device 10 illustrates a waypoint with the cartographic marker HLSDLK, and another waypoint I35. It should be understood that certain character strings will not have special characters, and/or blanks, and/or double consonants, and/or double vowels, and/or vowels, and in such an event processing steps for eliminating those occurrences are bypassed. Additionally, it should be understood that the sequence of processing described herein could be changed. However, the process described is the preferred process, and has been found to result in abbreviated character strings which retain enough of the substance of the original character string to allow a user to readily identify the geographical location associated with a waypoint. Additionally, in accordance with another advantage of the present invention, in the event an abbreviated cartographic marker name generated by the present invention is undesirable to the operator, the operator may quickly and easily edit the abbreviated character string by changing one or more characters in the string, through the use of conventional interface techniques. Even in such a circumstance, the number of in put operations needing to be executed are substantially less than required for defining and inputting the entire character string.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A navigation device comprising:
   a processor;
   a memory, connected to said processor, having cartographic data stored therein, said cartographic data including a character string corresponding to a geographical location; and
   an input for selecting said geographical location as a waypoint, wherein said processor retrieves said character string from memory, and when said character string has more than a selected number of characters said processor abbreviates said character string to said selected number of characters.

2. The navigation device as set forth in claim 1, wherein said character string is comprised of characters from a group consisting of special characters, consonants, vowels, and spaces, wherein said processor abbreviates said character string by performing at least one of the following processing steps:

when said character string has a special character therein, eliminating a special character;

when said character string has at least one space therein, eliminating a space;

when said character string has at least one vowel therein, eliminating a vowel;

when said character string has a pair of double consonants therein, eliminating one of said consonants of said pair; and when said character string has a pair of double vowels therein, eliminating one of said vowels of said pair.

3. The navigation device as set forth in claim 2, wherein said processor processes a character string from a right most character thereof, to a left most character thereof.

4. A navigation device comprising:

a processor;

a memory, connected to said processor, said memory having cartographic data stored therein, said cartographic data including a plurality of geographical names, each said geographical name associated with a corresponding geographical location;

a display, connected to said processor, for displaying said cartographic data; and an input, connected to said processor, for selecting one of said geographic locations, wherein said processor retrieves from memory the geographical name associated with said geographic location, and when said geographic name exceeds a desired number of characters, abbreviates said geographical name to a character string having said desired number of characters.

5. The navigation device as set forth in claim 4, wherein said processor analyzes said geographic name for blank spaces and, when said geographic name exceeds said desired number of characters and a blank space is present in said geographic name, said processor eliminates said blank space.

6. The navigation device as set forth in claim 4, wherein said processor analyzes said geographic name for a vowel and, when said geographical name exceeds said desired number of characters and a vowel is present in said geographical name, said processor eliminates said vowel.

7. The navigation device as set forth in claim 4, wherein said processor analyzes said geographical name for double consonants and, when said geographical name exceeds said desired number of characters and contains a pair of double consonants, said processor eliminates one of said consonants in said pair.

8. The navigation device as set forth in claim 4, wherein said processor abbreviates said geographical name by performing at least one of the following functions:

eliminating a space in said geographical name;

eliminating a vowel in said geographical name;

eliminating one of a pair of adjacent like consonants;

eliminating one of a pair of adjacent like vowels; and eliminating a special character in said geographical name.

9. A method of displaying cartographic marker information in a navigation device having a processor, a display, and a memory having cartographic data stored therein, said cartographic data including geographical names, each geographical name associated with data indicative of a corresponding geographic location, said method comprising:

retrieving from memory the geographical name associated with a desired geographic location;

abbreviating said geographical name; and displaying said abbreviated name on said display along with cartographic data representative of said desired geographical location.

10. The method of displaying cartographic marker information, as set forth in claim 9, wherein said step of abbreviating said geographical name further comprises:

analyzing said geographical name for the occurrence of a blank, and when a blank is present in said geographical name, eliminating said blank.

11. The method of displaying cartographic marker information as set forth in claim 10, wherein said step of analyzing comprises analyzing said geographical name from right to left.

12. The method of displaying cartographic marker information as set forth in claim 9, wherein said step of abbreviating said geographical name further comprises:

analyzing said geographical name for the presence of double consonants, and when a pair of double consonants is present in said geographical name, eliminating one of the consonants of said pair of double consonants.

13. The method of displaying cartographic marker information as set forth in claim 9, wherein said step of abbreviating said geographical name further comprises:

analyzing said geographical name for the presence of double vowels and when a pair of double vowels is present in said geographical name, eliminating one of the vowels of said pair of double vowels.

14. The method of displaying cartographic marker information as set forth in claim 9, wherein said step of abbreviating said geographical name further comprises:

analyzing said geographical name for vowels, and when said geographical name contains a vowel, eliminating said vowel.

15. The method of displaying cartographic marker information as set forth in claim 9, wherein said step of abbreviating said geographical name further comprises:

analyzing said geographical name for special characters and when said geographical name contains a special character eliminating said special character.

16. The method of displaying cartographic marker information as set forth in claim 9 further comprising:

comparing said abbreviated name with other geographical names stored in memory and, when said abbreviated name matches another name, modifying said abbreviated name.

17. A navigation device comprising:

a memory having cartographic data stored therein, said cartographic data including geographic names associated with corresponding geographic locations;

a display; and processing means for abbreviating said geographic names for display on said display.

18. The navigation device as set forth in claim 17 further comprising:

input means for editing abbreviated geographic names displayed on said display.

* * * * *

UNITED STATES PATENT AND TRADEMARK OFFICE
CERTIFICATE OF CORRECTION

PATENT NO. : 6,076,039
DATED : June 13, 2000
INVENTOR(S) : Darrin W. Kabel et al.

It is certified that error appears in the above-identified patent and that said Letters Patent is hereby corrected as shown below:

Delete the title as shown on cover page and insert the correct title as amended and accepted:

NAVIGATION DEVICE AND METHOD FOR DISPLAYING CARTOGRAPHIC MARKERS

IN AN ABBREVIATED MANNER

Signed and Sealed this

Tenth Day of April, 2001

*Attest:*

NICHOLAS P. GODICI

*Attesting Officer*   *Acting Director of the United States Patent and Trademark Office*